(12) United States Patent
Hino et al.

(10) Patent No.: US 8,667,259 B2
(45) Date of Patent: Mar. 4, 2014

(54) DATA PROCESSOR AND MEMORY READ ACTIVE CONTROL METHOD

(75) Inventors: Mitsuaki Hino, Kawasaki (JP); Yasuhiro Yamazaki, Kahoku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 578 days.

(21) Appl. No.: 12/040,269

(22) Filed: Feb. 29, 2008

(65) Prior Publication Data

US 2008/0215865 A1 Sep. 4, 2008

(30) Foreign Application Priority Data

Mar. 2, 2007 (JP) ................................. 2007-053127

(51) Int. Cl.
*G06F 9/32* (2006.01)
(52) U.S. Cl.
USPC .......................................... 712/239; 712/234
(58) Field of Classification Search
USPC ............................. 712/234, 237, 238, 239, 240
See application file for complete search history.

(56) References Cited

U.S. PATENT DOCUMENTS

| | | | | | |
|---|---|---|---|---|---|
| 5,752,259 | A | * | 5/1998 | Tran ............................... | 711/125 |
| 5,764,946 | A | * | 6/1998 | Tran et al. ...................... | 712/239 |
| 5,794,028 | A | * | 8/1998 | Tran ............................... | 712/240 |
| 5,802,602 | A | * | 9/1998 | Rahman et al. ................ | 711/204 |
| 5,974,542 | A | * | 10/1999 | Tran et al. ...................... | 712/239 |
| 6,016,545 | A | * | 1/2000 | Mahalingaiah et al. ....... | 712/238 |
| 6,079,003 | A | * | 6/2000 | Witt et al. ...................... | 711/200 |
| 6,079,005 | A | * | 6/2000 | Witt et al. ...................... | 711/213 |
| 6,101,595 | A | * | 8/2000 | Pickett et al. .................. | 712/205 |
| 6,167,510 | A | * | 12/2000 | Tran ............................... | 712/239 |
| 6,266,752 | B1 | * | 7/2001 | Witt et al. ...................... | 711/200 |
| 7,159,097 | B2 | * | 1/2007 | McDonald ..................... | 712/205 |
| 7,380,110 | B1 | * | 5/2008 | Nuckolls et al. ............... | 712/239 |
| 7,631,146 | B2 | * | 12/2009 | Park et al. ...................... | 711/128 |
| 2004/0030866 | A1 | * | 2/2004 | McDonald ..................... | 712/217 |
| 2006/0095680 | A1 | * | 5/2006 | Park et al. ...................... | 711/137 |

FOREIGN PATENT DOCUMENTS

| | | |
|---|---|---|
| JP | 2000-222205 | 8/2000 |
| JP | 2001-521241 | 11/2001 |
| JP | 2002-196981 | 7/2002 |
| JP | 2005-535955 | 11/2005 |
| JP | 2006134331 A * | 5/2006 |
| WO | WO-99/22293 | 5/1999 |
| WO | 2004/015560 A2 | 2/2004 |

OTHER PUBLICATIONS

Emer, Joel and Gloy, Nikolas, "A Language for Describing Predictors and its Application to Automatic Synthesis", © 1997 ACM, pp. 304-314.*

(Continued)

*Primary Examiner* — Aimee Li
(74) *Attorney, Agent, or Firm* — Fujitsu Patent Center

(57) ABSTRACT

Instruction cache memory having a plurality of memory (for example, cache WAY), means 3 for storing prediction data of a conditional branch of a branch instruction being taken or not taken and for storing prediction data of memory storing the branch instruction data of the plurality of memory when the prediction is the branch being taken, and means for, when an instruction to be executed is a branch instruction, outputting a read active control signal to the plurality of memories 1 by using two pieces of prediction data obtained from the means by an index corresponding to the branch instruction, are comprised.

6 Claims, 15 Drawing Sheets

(56) References Cited

OTHER PUBLICATIONS

Michael D. Powell et al., "Reducing Set-Associative Cache Energy via Way-Prediction and Selective Direct-Mapping," Proceedings of the 34th International Symposium on Microarchitecture (MICRO), 2001, pp. 54-65.

Chinese Office Action dated Nov. 20, 2009 issued in corresponding Chinese Patent Application 200810083121.1.

Scott McFarling, "Combining Branch Predictors", *WRL Technical Note TN-36*, Jun. 1993, (29 pages).

Japanese Office Action mailed Sep. 6, 2011 for corresponding Japanese Application No. 2007-053127, with partial English-language translation.

* cited by examiner

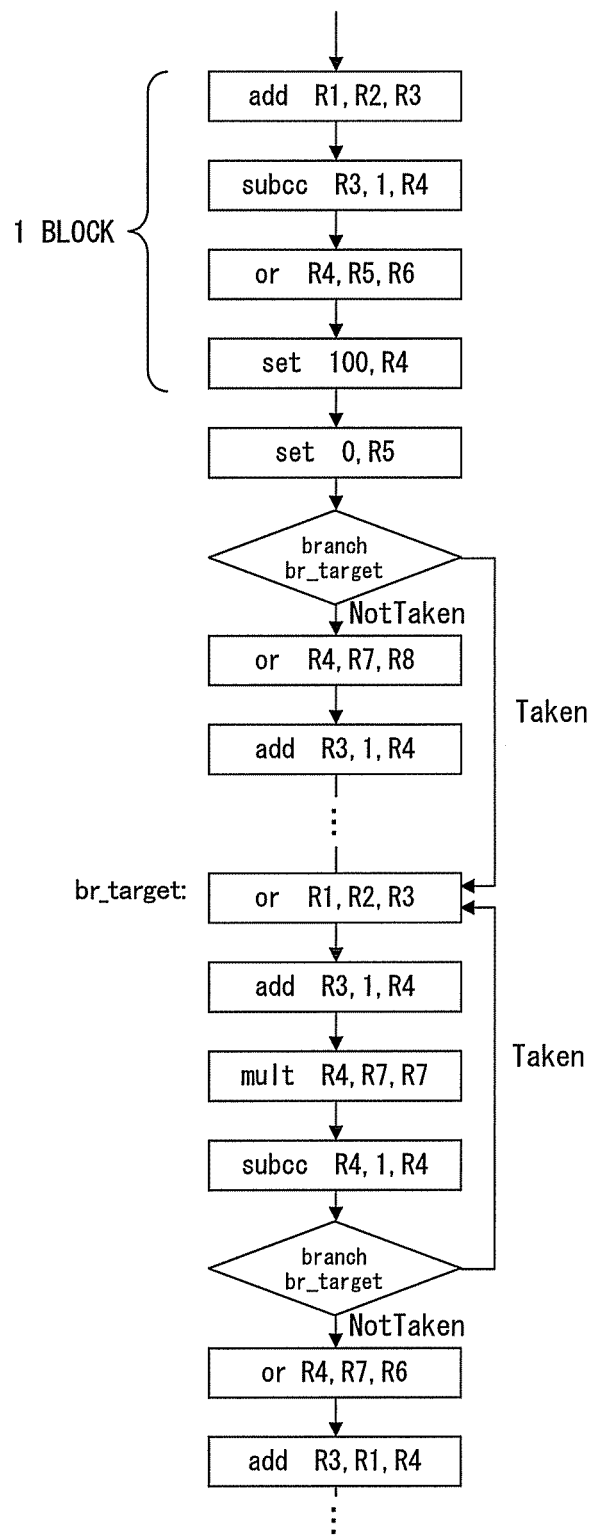
F I G. 4

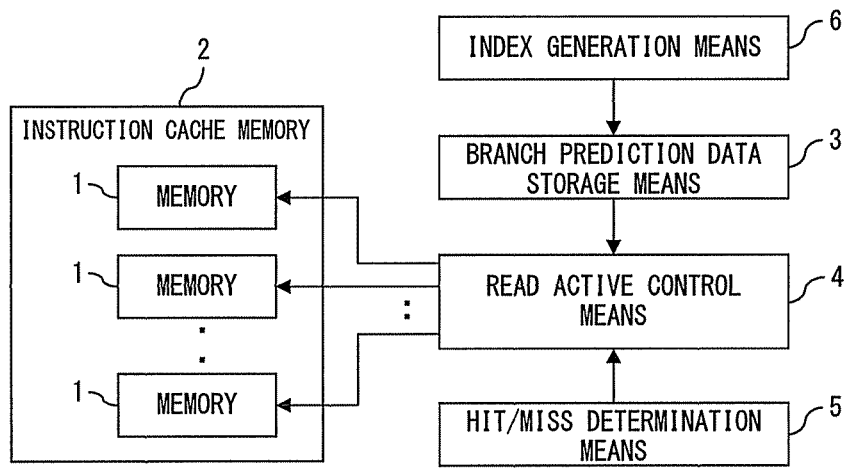
F I G. 5

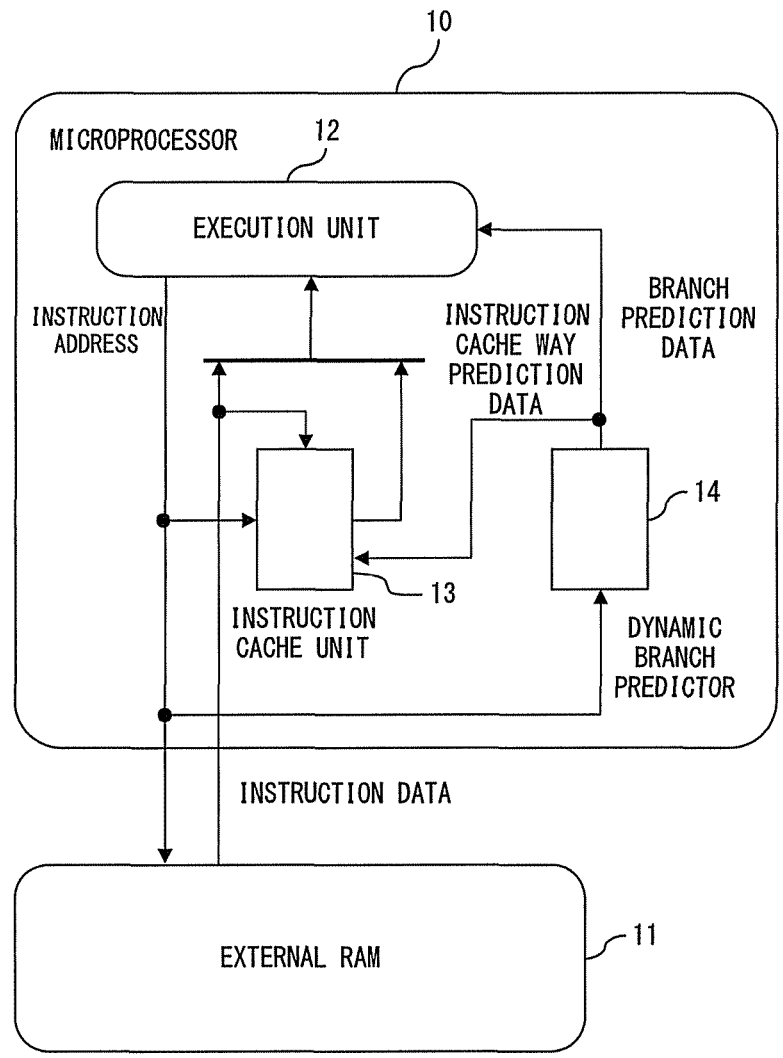
F I G. 6

| BRANCH INSTRUCTION DETECTION SIGNAL | Prediction[2:0] (PREDICTION COUNTER) | Cache ReadActive SIGNAL | |
|---|---|---|---|
| | | WAY0 | WAY1 |
| 0 | — | WAY0 Active | WAY1 Active |
| 1 | 000 (Strongly NotTaken) | WAY0 Active | WAY1 Active |
| | 001 (Weakly NotTaken) | | |
| | 010 (Weakly Taken) | 1 | 1 |
| | 011 (Strongly Taken/Cache-miss) | 1 | 1 |
| | 100 (Strongly Taken/Cache-WAY0) | 1 | 0 |
| | 101 (Strongly Taken/Cache-WAY1) | 0 | 1 |

F I G. 1 1

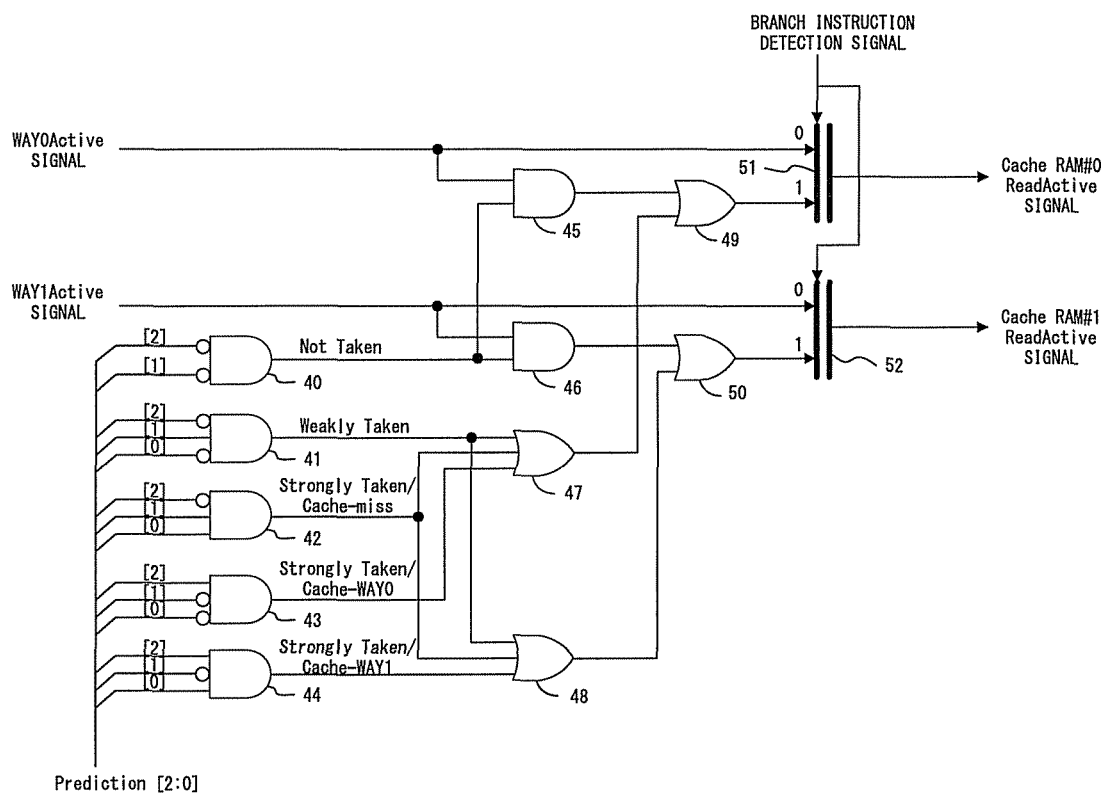
F I G. 1 2

DATA PROCESSOR AND MEMORY READ ACTIVE CONTROL METHOD

CROSS-REFERENCE TO RELATED APPLICATIONS

This application is based upon and claims the benefit of priority from the prior JAPANESE Patent Application No. 2007-053127 filed on Mar. 2, 2007, the entire contents of which are incorporated herein by reference.

BACKGROUND OF THE INVENTION

1. Field of the Invention

The present invention relates to a data processor, and specifically to a data processor such as a microprocessor and an image processor that have an instruction cache with plural WAYs, and to a read active control method for the plural WAYs for reducing power consumption of the data processor.

2. Description of the Related Art

FIG. 1 is a block diagram of a configuration example of a conventional data processor system that has an instruction cache. In FIG. 1, a microprocessor 100 is connected to external RAM 101 that serves as external memory. The microprocessor 100 has an execution unit 102 for executing instructions, an instruction cache unit 103 for temporarily storing instruction data, a dynamic branch predictor 104 for, when an instruction to be executed is a branch instruction, outputting branch prediction data in which whether a (conditional) branch is taken or not is predicted, and a selector 105 for selecting the instruction data from the external RAM 101 or the instruction data stored in the instruction cache unit 103 and for providing the selected instruction data to the execution unit 102.

If the instruction data that is designated by an instruction address and that is requested from the execution unit 102 is not stored in the instruction cache unit 103, the corresponding instruction data is read from the external RAM 101 and provided to the execution unit 102, and the corresponding instruction data is also stored in the instruction cache unit 103.

If the execution unit 102 requests the same instruction data again, the corresponding instruction data is read from the instruction cache unit 103 and is provided to the execution unit 102 via the selector 105. In general, the access time to the instruction cache unit 103 is faster than the access time to the external RAM 101, and as a result, by having the instruction cache unit it is possible to reduce the required amount of time from the reading of instructions to execution of the instructions.

FIG. 2 is a diagram explaining a conventional example of dynamic branch prediction with the use of the dynamic branch predictor 104 of FIG. 1. The example is generally referred to as a GShare predictor. The dynamic branch predictor 104 for predicting whether a (conditional) branch is taken or not in response to a branch instruction described in FIG. 1 has a program counter 110, a branch history Register (BHR) 111, an exclusive OR operator (XOR) 112, and a pattern history table (PHT) 113 in FIG. 2. The operation of the dynamic branch predictor 104 is described in Non-Patent Document 1. Note that in Non-Patent Document 1, the PHT 113 is referred to as a counter table.

In FIG. 2, the BHR 111 shifts the execution results of the past branch instructions one after another regardless of the branch instruction addresses, and stores the execution results as a global branch history. Data with m-bits is output from the BHR 111, the XOR 112 XORs the m bit data and an n ($\geq$m)-bit instruction address output from the program counter 110, and the resulting n-bit is used as an index to perform a search in the PHT. As described above, by using the result of the XOR operation of the n-bit output from the PC 110 and the m-bit output from the BHR 111 as an index for a search in the PHT 113, it is possible to store branch prediction data corresponding to a branch instruction in the PHT 113 in the form of an approximately one-to-one relation with the branch instruction addresses without deviation of the branch prediction data (i.e. prediction data) to some of the plural entries in the PHT 113.

The prediction data stored in each of the entries in the PHT 113 has 2 bits for each entry. In the prediction data, values change in response to the result of whether the (conditional) branch is taken or not, i.e. Taken/Not Taken, at every execution of the branch instruction. The values are equivalent to count values of the counter to which "1" is added when the branch is taken and from which "1" is subtracted when the branch is not taken.

The right half of FIG. 2 is a diagram explaining the state transition of the branch prediction data (prediction data). In Non-Patent Document 1, the branch prediction data stored in each of the entries in the PHT 113 is data that reflects the success or failure of the previous branch prediction in addition to reflecting the immediately preceding execution result of the corresponding branch instruction of whether the branch is taken or not.

A state of Strongly Taken (data 11 of the entry), for example, indicates that the previous branch prediction was successful in conjunction with the prediction of a branch instruction being taken in response to the execution result of the previous branch instruction, whereas a state of Weakly Taken (10) indicates that the previous prediction failed despite the prediction of the branch instruction being taken. In the manner described above, Strongly Not Taken (00) and Weakly Not Taken (01) indicate the respective states.

If the instruction cache unit 103 of FIG. 1 has plural cache WAYS, by predicting the WAY that stores the instruction data requested by the execution unit 102 and making the predicted WAY chip-enabled and other WAYs chip-disabled, it is possible to reduce power consumption, and as a result, a data processor having an instruction cache unit that can be operated with a low power consumption can be provided.

FIG. 3 is a configuration block diagram of an instruction cache unit that can be operated with a low power consumption and that is described in Patent Document 1 as a prior art. The operation of the unit in FIG. 3 is explained by using an example of an instruction sequence in FIG. 4. An example of an instruction sequence including branch instructions is shown in FIG. 4. Here, the operation of the instruction cache unit of FIG. 3 is explained under the assumption that four consecutive instructions are counted as one block and the instruction data corresponding to the instructions in one block is stored in only one of the plural cache WAYs.

In FIG. 3, the instruction cache unit has an instruction address register 120 for storing instruction addresses; plural (in this case two) cache RAMs $121_0$ and $121_1$ corresponding to plural cache WAYs; tag RAMs $122_0$ and $122_1$ corresponding to the two cache RAMs $121_0$ and $121_1$ respectively; two comparators $123_0$ and $123_1$ that compare outputs of the two tag RAMs with the tag address output from the instruction address register; a block head detector 124 for detecting the head instruction of a block using a block offset as a part of the instruction address; a hit/miss determination logic circuit 125 for determining whether the instruction data requested by either of the two cache RAMs $121_0$ or $121_1$ is stored (hit) or is not stored (miss) in response to the outputs of the two comparators $123_0$ and $123_1$, the output of the block head detector 124, and an entry valid signal that indicates that value data is stored in the entry designated by an address output by the tag RAMs $122_0$ and $122_1$ in the corresponding cache RAMs $121_0$ and $121_1$ and that is output from the tag RAMs $122_0$ and $122_1$; two inverters $126_0$ and $126_1$, for inverting a cache RAM ReadActive signal, which is a signal output from the hit/miss determination logic circuit 125 and that causes each of the cache RAMS $121_0$ and $121_1$ to be read active or chip enabled, and for providing the inverted signal to a chip enable (CE) terminal of a negative logic (an open circle omitted in FIG. 3); and a selector 127 for selecting and outputting instruction data output from either the cache RAM $121_0$ or $121_1$, which store the requested instruction data.

The effect of the power consumption reduction in the instruction cache unit in FIG. 3 is further explained in the following.

In a cycle in which an address of an instruction that is detected as a head of a block by the block head detector 124 is provided, the hit/miss determination logic circuit 125 causes both of the cache RAM ReadActive signals of the two cache RAMs $121_0$ and $121_1$ to be "H", makes the two cache RAMs chip-enabled, and enables reading of the instruction data from the two cache RAMs.

In the next cycle (to which the next address of the instruction is given), the hit/miss determination logic circuit 125 leaves the cache RAM ReadActive signal to be "H" only for the cache RAM corresponding to the combination of comparator and tag RAM that has the comparator outputting "H" and the tag RAM outputting "H" as an entry validity signal, and changes the cache RAM ReadActive signal to "L" for other cache RAMs. In two cycles in which two trailing instruction addresses in the block are given, the same read active control state is maintained so that the reduction of the power consumption can be achieved. Note that if neither of the two cache RAMs $121_0$ nor $121_1$ store the requested instruction data, a cache miss signal is output from the hit/miss determination logic circuit 125, and reading of the instruction data from the external RAM 101 is performed as described above.

In Patent Document 1, however, there is a problem such that when an instruction corresponding to the instruction address output from the execution unit is a branch instruction, both of the two cache RAMs are in the chip enabled state that is same as the time of the block head instruction detection. Power consumption is not reduced at the time of the branch instruction detection, and therefore the effect of sufficient power consumption reduction is not obtained.

In Patent Document 2, which shows a conventional art for predicting a WAY in which a requested piece of instruction data is stored from the plural instruction cache WAYs, a technology for reducing power consumption is implemented by storing set prediction information relating to an accessed set of associative memory in various positions such as a branch target buffer, an instruction ache, and an operand history table, and by reducing the delay of access to the set associative cache of instructions and data. However, in order to realize the technology, a high-capacity branch target buffer for storing tag addresses and target addresses is required, the addition of such a large-capacity storage increases the power consumption, which is a problem.

Patent Document 3 that describes a conventional art of such WAY prediction of instruction cache discloses a technology for processing non-sequential instructions in which additional cache WAY prediction memory is provided to facilitate caching of non-sequential instructions. However, the technology in Patent Document 3 has a problem such that only the latest WAY hit/miss result is held for cache WAY prediction, and high accuracy of the branch prediction and cache WAY prediction cannot be expected.

Non-Patent Document 1

S. McFarling: "Combining Branch Predictors", Technical Note TN-36, Western Research Laboratory (June 1993)
[Patent Document 1]
Japanese Patent Application Publication No. 2002-196981 "Data Processor"
[Patent Document 2]
Japanese Patent Application Publication No. 2000-222205 "Method and Device for Reducing Delay of Set Associative Cache by Set Prediction"
[Patent Document 3]
Japanese Patent Application Publication No. 2005-535955 "Instruction Cache Way Prediction for Jump Targets"

SUMMARY OF THE INVENTION

According to an aspect of an embodiment, a data processor, comprises: instruction cache memory having a plurality of memory;a branch prediction data storage unit for storing prediction data of a conditional branch of a branch instruction being taken or not taken, and in a case of the conditional branch being taken, prediction data of memory storing data of the branch instruction from among the plurality of memory; and a read active control unit for, when an instruction is to be executed in a branch instruction, outputting a read active control signal to the plurality of memories by using the prediction data of the conditional branch being taken or not taken obtained from the branch prediction data storage unit by an index corresponding to the branch instruction, and the prediction data of the memory.

BRIEF DESCRIPTION OF THE DRAWINGS

FIG. 4 is an example of a instruction sequence executed by the data processor;

FIG. 5 is a block diagram of the principle configuration of the data processor of the present invention;

FIG. 6 is a block diagram of a configuration example of a data processing system of the present embodiment;

FIG. 11 is a diagram explaining the determination logic of the ReadActive signal to cache WAY;

FIG. 12 is a circuit diagram of a configuration example of the ReadActive control circuit of FIG. 8;

DESCRIPTION OF THE PREFERRED EMBODIMENTS

Figure 1:
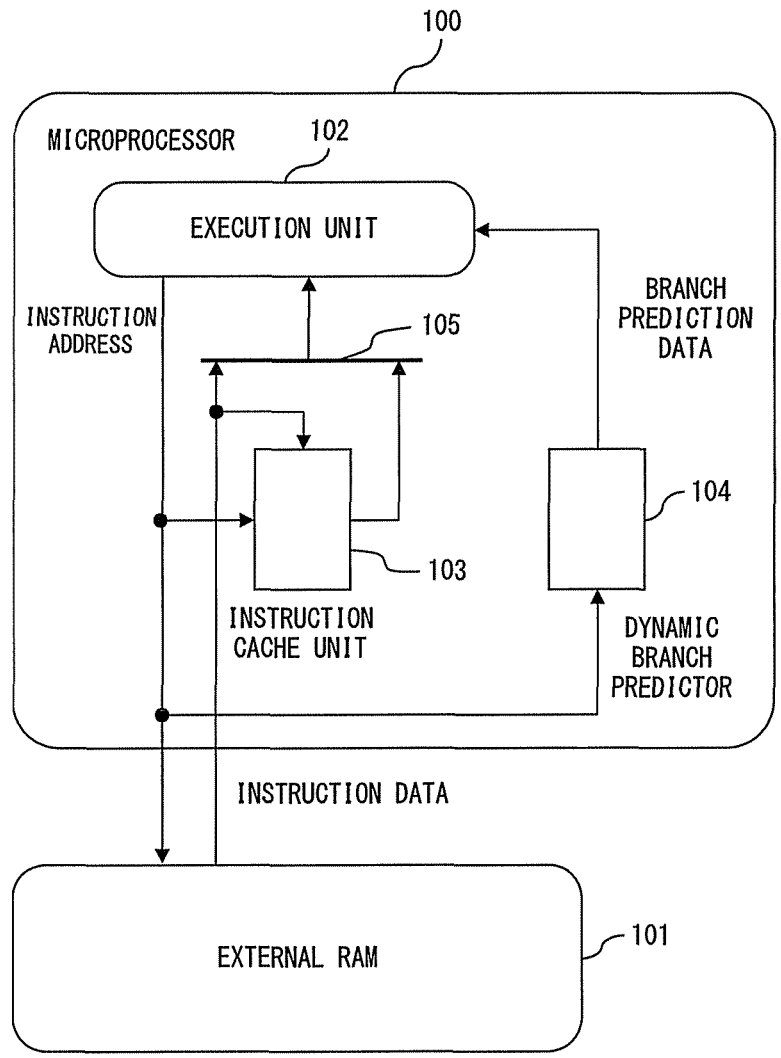
FIG. 1 is a block diagram of a configuration example of a conventional data processor system.

FIG. 5 is a block diagram of the principle configuration of the data processor of the present embodiment. In FIG. 5, the data processor comprises instruction cache memory 2 having plural memories 1, branch prediction data storage means 3, ReadActive control means 4, hit/miss determination means 5, and index generation means 6, and additionally comprises an execution unit that is not shown in the drawing.

The branch prediction data storage means 3 is for example a pattern history table, and stores prediction data of whether a branch instruction is taken or not and prediction data of one of the plural memories 1, which stores the branch instruction data, when the prediction is such that the branch instruction is taken.

The ReadActive control means 4 is for example a ReadActive control circuit; when an instruction to be executed is a branch instruction, it outputs, in response to an index corresponding to the branch instruction and output from the index generation means 6, a ReadActive control signal to the plural memories 1 using the prediction data of whether a (conditional) branch is taken or not output from the branch prediction data storage means 3 and the memory prediction data.

The hit/miss determination means 5 outputs to the ReadActive control means 4 data indicating the memory that stores the instruction data in response to the address of the instruction to be executed. When the instruction to be executed is not a branch instruction or when the instruction is a branch instruction but it is predicted that the branch is not taken, the ReadActive control means 4 outputs the data indicating the memory to the plural memories 1 as the ReadActive control signal.

As described above, in the present embodiment, by outputting the ReadActive control signal for causing to be active the memory 1, which are predicted to store branch instruction data, from among the plural memories 1, power consumption of other memory 1 is reduced.

FIG. 6 is a configuration example of a data processing system of the present embodiment. In FIG. 6, as with the prior art of FIG. 1, a microprocessor 10 is connected to an external RAM 11, and inside the microprocessor there is an execution unit 12, an instruction cache unit 13, and a dynamic branch predictor 14. Compared with FIG. 1, the present embodiment is fundamentally different in that in the present embodiment WAY prediction data of the instruction cache is provided from the dynamic branch predictor 14 to the instruction cache unit 13.

Figure 3:
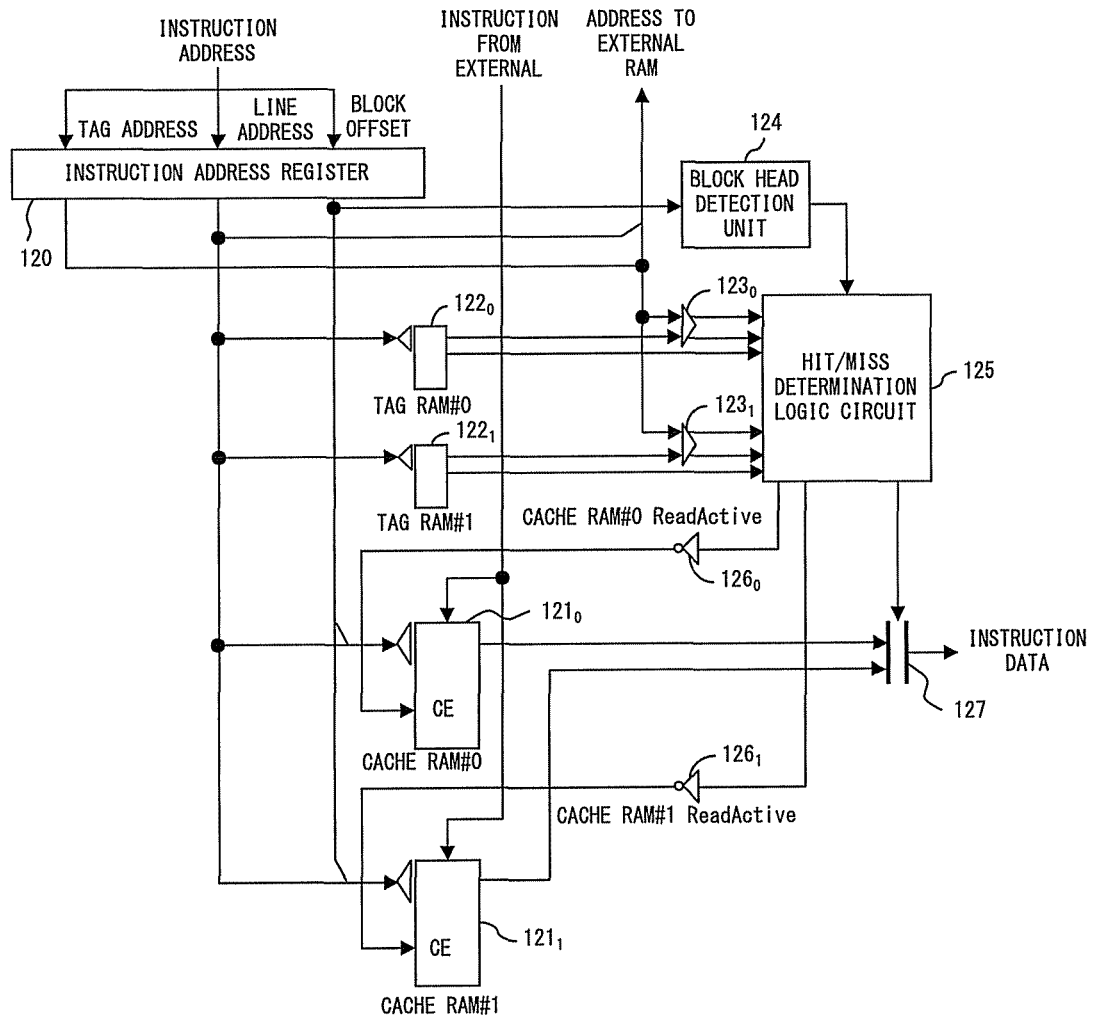
FIG. 3 is a block diagram of a conventional configuration of an instruction cache unit.
Figure 7:
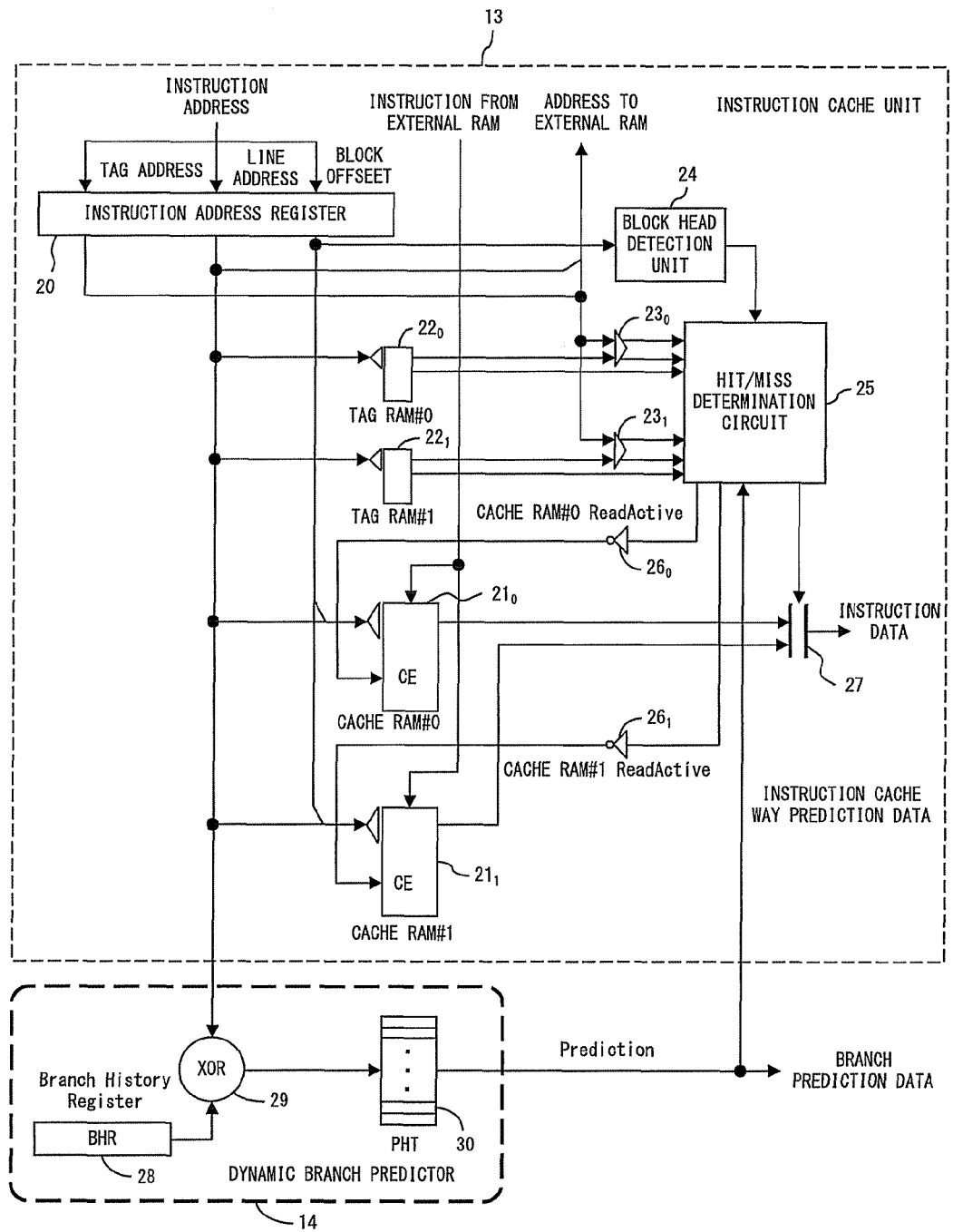
FIG. 7 is a block diagram of a configuration of the instruction cache unit and the dynamic branch predictor of the present embodiment.

FIG. 7 is a block diagram of a configuration of the instruction cache unit 13 and the dynamic branch predictor 14 of the present embodiment. The instruction cache unit 13, like the conventional example of FIG. 3, has an instruction address register 20, plural (in this case two) cache RAMs $21_0$ and $21_1$ corresponding to plural WAYs of instruction cache, tag RAMs $22_0$ and $22_1$ corresponding to each of the cache RAMs, tag comparators $23_0$ and $23_1$ a block head detector 24, a hit/miss determination logic circuit 25, inverters $26_0$ and $26_1$ and a selector 27. The fundamental difference from the conventional example of FIG. 3 is that the branch prediction data output from the dynamic branch predictor 14 is provided to the hit/miss determination logic circuit 25 in the instruction cache unit 13.

Figure 2:
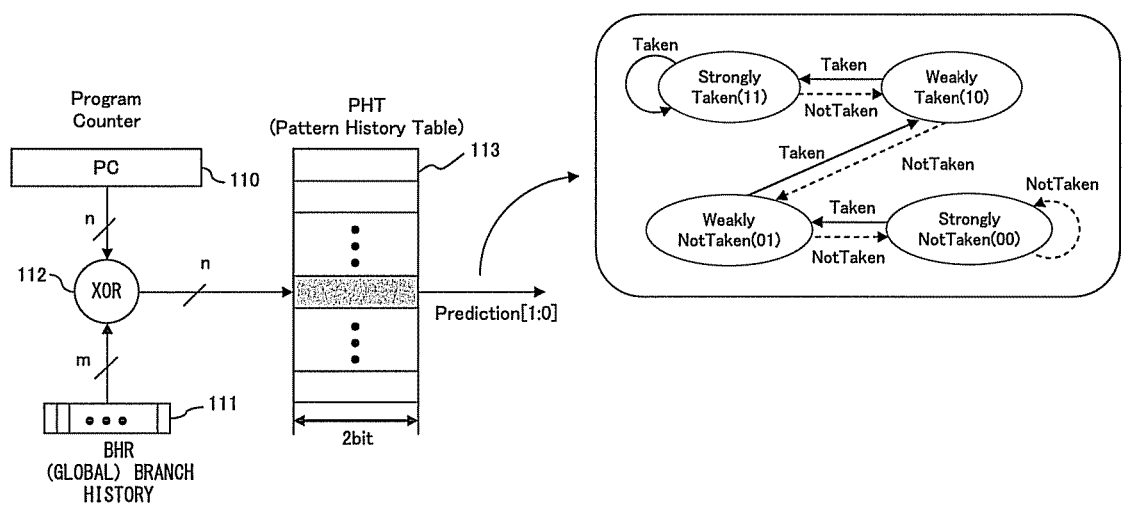
FIG. 2 is a diagram explaining a conventional example of a dynamic branch prediction.

In FIG. 7, an instruction address is provided from the instruction address register 20 to the dynamic branch predictor 14, replacing the program counter in the conventional example of FIG. 2. An exclusive OR of the instruction address and the output of a branch history register (BHR) 28 are taken by an XOR 29, and with the data of the exclusive OR as an index, entries of a pattern history table (PHT) 30 are searched. The branch prediction data (prediction data) stored in the entry is provided to the hit/miss determination logic circuit 25, and is also provided to the execution unit 12 in FIG. 6. In the conventional example of FIG. 2, the data stored in each of the entries of the pattern history table (PHT) has 2 bits; however, in the present embodiment, the data has 3 bits as explained later. Note that the index generation unit in claim 3 of the present invention corresponds to the BHR 28 and the XOR 29.

Figure 8:
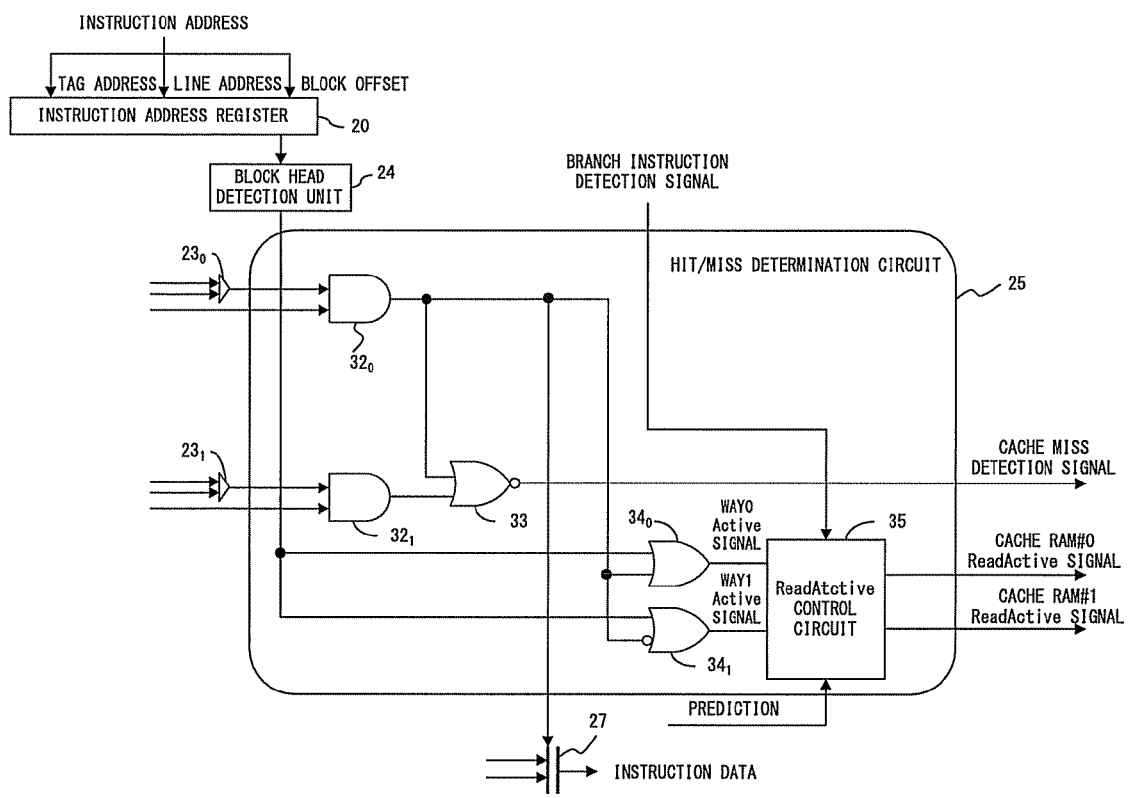
FIG. 8 is a block diagram of the configuration of a hit/miss determination logic circuit of FIG. 7.

FIG. 8 is a detailed block diagram of the configuration of the hit/miss determination logic circuit 25 in the instruction cache unit 13 of FIG. 7. In FIG. 8, the hit/miss determination logic circuit 25 comprises two AND gates $32_0$ and $21_1$ a NOR gate 33, two OR gates $34_0$ and $34_1$, and a ReadActive control circuit 35.

The output of the tag address comparators $23_0$ and $23_1$ corresponding to two cache RAMs $21_0$ and $21_1$ of FIG. 7 and the entry validity signal that is output from the tag RAMs $22_0$ and $22_1$ and that indicates that instruction data valid to the entry corresponding to the tag address in the cache RAMs $21_0$ and $21_1$ is stored are input into the AND gates $32_0$ and $32_1$, and when both of the inputs are "H", "H" is output from the AND gates.

The output of the AND gate $32_0$ is provided to the NOR gate 33 and the two OR gates $34_0$ and $34_1$, and is also provided to the selector 27 as a selection control signal. The selector 27 selects the instruction data output from the cache RAM $21_0$ when, for example, the output of the AND gate $32_0$ is "H", and selects the instruction data output from the cache RAM $21_1$ when the output is "L".

To the NOR gate 33, the output of the AND gate $32_1$ is also provided, and when both of the outputs of the two AND gates $32_0$ and $32_1$ are "L", a cache miss detection signal, i.e., a signal indicating that neither of the two cache RAMs $21_0$ and $21_1$ stores the corresponding instruction data, is output from the NOR gate. In response to the cache miss detection signal, instruction data is read from the external RAM 11 of FIG. 6 and is provided to the execution unit 12, and at the same time, the instruction data is stored in the instruction cache unit 13.

To each of the two OR gates $34_0$ and $34_1$, the output of the AND gate $32_0$ and the output of the block head detection unit 24 are provided. Of the two input terminals of the OR gate $34_1$, the input terminal to which the output of the AND gate $32_0$ is provided has negative logic.

The OR gate $34_0$ outputs a WAY0 active signal as "H" to the ReadActive control circuit 35 when the output of the AND gate $32_0$ or the output of the block head detection unit 24 is "H". The OR gate $34_1$ outputs a WAY1 active signal as "H" to the ReadActive control circuit 35 when the output of the AND gate $32_0$ is "L" or the output of the block head detection unit 24 is "H".

The WAY0 active signal and the WAY1 active signal provided to the ReadActive control circuit 35 are provided as a cache RAM #0 ReadActive signal and a cache RAM #1 ReadActive signal, respectively, from the ReadActive control circuit 35 to the inverters $26_0$ and $26_1$ when, for example, the instruction corresponding to the instruction address is not a branch instruction. The corresponding cache RAM $21_0$ or $21_1$ is made chip-enabled, and as a result reading of the instruction data is allowed. For that reason, to the ReadActive control circuit 35, a (for example) branch instruction detection signal output from a central processing unit (CPU) that is not shown in FIG. 6 is provided. In addition, the branch prediction (prediction) data as an output of the dynamic branch predictor 14 is also provided to the ReadActive control circuit 35. The configuration of the ReadActive control circuit 35 is explained later. It should be noted that the hit/miss determination unit in claim 2 of the present invention corresponds to the part of the hit/miss determination logic circuit 25, not including the ReadActive control circuit 35, and the signal indicating the memory that stores the instruction data corresponds to the WAY0 active signal and the WAY1 active signal.

Figure 9:
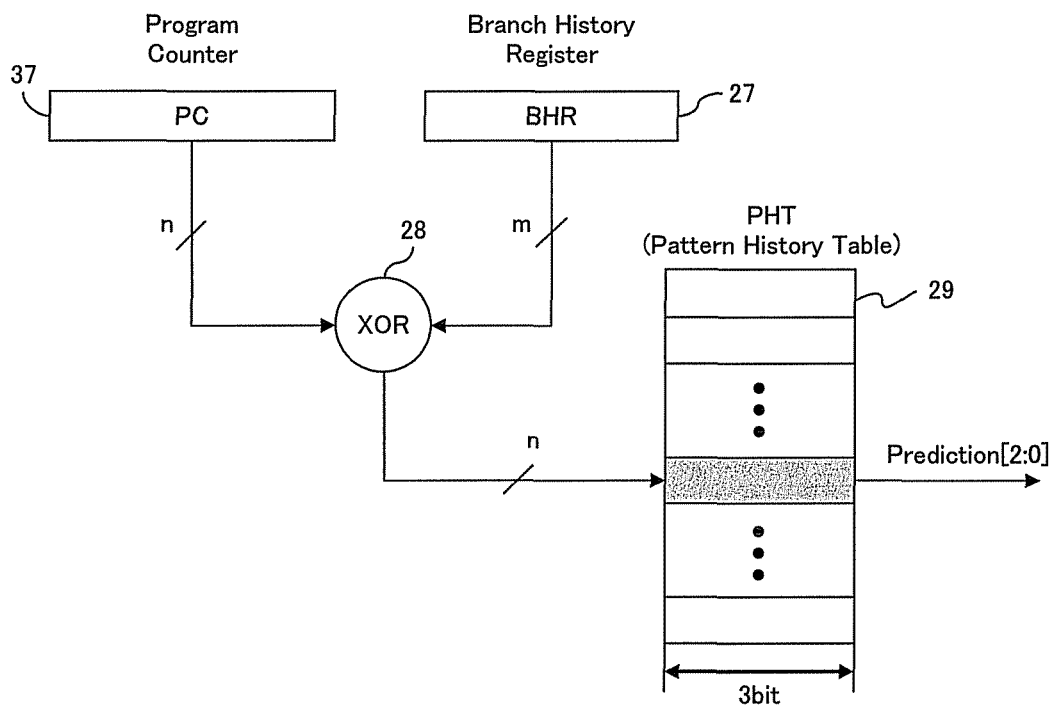
FIG. 9 is a diagram explaining a system of outputting the branch prediction data.

FIG. 9 is a diagram explaining a system of outputting the branch prediction data (prediction data) from the dynamic branch predictor in the present embodiment. In FIG. 9, the prediction data output system is mostly the same as the conventional example shown in FIG. 2, in which an exclusive OR of the n-bit instruction address as an output of the program counter 37 and the m-bit branch history data output from the branch history register 27 are taken by the XOR 28, the n-bit data result is provided as an index to the pattern history table (PHT), and 3-bit entry data searched on the basis of the index is output as branch prediction data.

Figure 10:
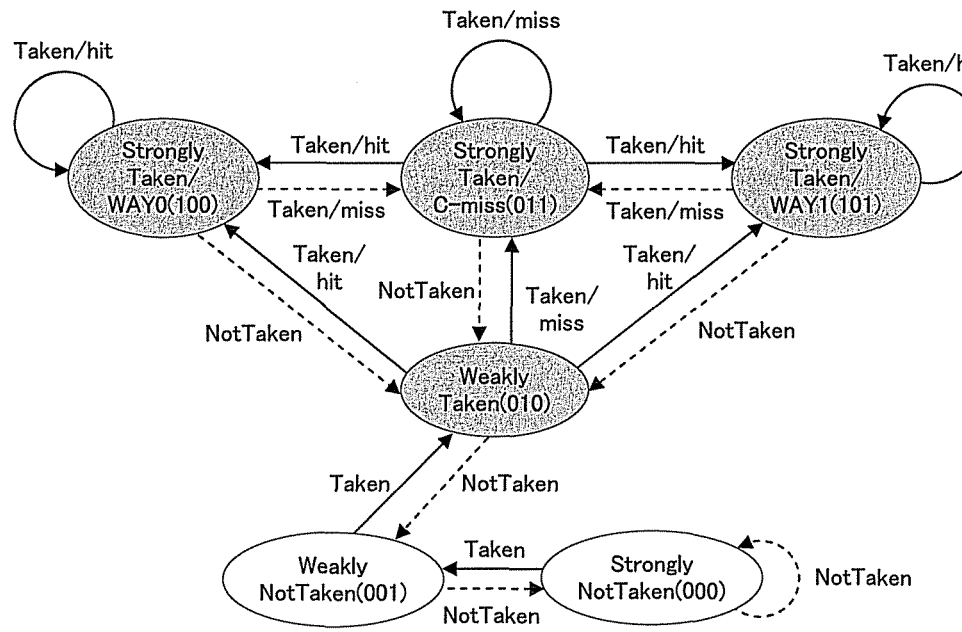
FIG. 10 is a diagram explaining the state transition of the branch prediction data.

FIG. 10 is a diagram explaining the state transition of the branch prediction data stored in each of the entries of the pattern history table. Comparison of FIG. 10 with the conventional example of the state transition in FIG. 2 shows the difference whereby the prediction data of Strongly Taken has three states in which either of the two cache RAMs $21_0$ and $21_1$, i.e. the WAY0 or and WAY1, are predicted and a state in which no WAY is predicted, i.e. cache miss; in other words, the prediction data is divided into three parts, prediction data "100" predicting WAY0, "101" predicting WAY 1, and "011" predicting cache miss. In response to the execution result of the branch instruction, the state transition is performed between data corresponding to each of the states.

It should be noted that in FIG. 10, Taken/hit that trigger the state transition between three states of Strongly Taken and Weakly Taken indicate that a branch is taken and that the prediction of the cache WAY is hit. Taken/miss indicates that the prediction of cache WAY has failed, including a case in which the branch was taken but cache miss occurred. In addition, in a case in which the WAY prediction fails in a state of, for example, Strongly Taken/WAY1 and WAY0 is to be read active, the state transits to a state of Strongly Taken C-miss. In a case in which the branch is taken in the state of Weakly Taken and the branch instruction data is read from cache, that either WAY0 or WAY1 is hit is recognized, and therefore, the state transition is performed in response to the result.

FIG. 11 is a diagram explaining the determination logic of the cache RAM ReadActive signal provided to the two inverters $26_0$ and $26_1$ of FIG. 7 in response to each of the states of the branch prediction data of FIG. 10. In FIG. 11, when the branch instruction detection signal is "0", i.e., when the instruction corresponding to the instruction address stored in the instruction address register 20 is not a branch instruction, the ReadActive signals of the two cache RAMs output from the ReadActive control circuit 35 are a WAY0 active signal and a WAY1 active signal as an input to the ReadActive control circuit 35.

In a case in which the branch prediction data is "000" or "001", i.e., when the data predicting that the branch is not taken even if the branch instruction detection signal is "1", as in the case of the branch instruction detection signal being "0", the WAY0 active signal and WAY 1 active signal input into the ReadActive control circuit 35 are used as a cache ReadActive signal.

In a case in which the value of the branch instruction detection signal is "1" and the state is cache miss even though the branch prediction data is Weakly Taken or Strongly Taken, i.e., "010" or "011", the state is such that the previous branch prediction failed, and the cache WAY prediction is not stable. As a result, both of the values of the ReadActive signals corresponding to the two cache RAMs $21_0$ and $21_1$ are "1", i.e. "H", and both of the cache RAMs $21_0$ and $21_1$ are in the chip-enabled state.

Finally, in a case in which the value of the branch instruction detection signal being "1" and the prediction data has a value of "100" or "101" indicating Strongly Taken/cache WAY0 or Strongly Taken/cache WAY 1, respectively, a ReadActive signal for making the cache RAMs $21_0$ and $21_1$ corresponding to respective prediction WAYs chip-enabled is output.

FIG. 12 is a circuit diagram of a configuration example of the ReadActive control circuit. In FIG. 12, the ReadActive control circuit has seven AND gates 40-46, four OR gates 47-50, and two selectors 51 and 52.

To five of the AND gates 40-44, the prediction data output from the PHT 29 of FIG. 9, i.e., 3-bit branch prediction data, is provided. The upper 2 bits are provided only to the AND gate 40, and both of the two input terminals of the AND gate have negative logic. The input terminal of the highest-order bit and the lowest-order bit of the input terminals of the AND gate 41, the input terminal of the highest-order bit of the AND gate 42, the input terminal of the lowest-order bit and the intermediate bit of the AND gate 43, and the input terminal of the intermediate bit of the AND gate 44 also have negative logic.

As a result of having negative logic, a signal indicating Not Taken is provided from the AND gate 40 to the two AND gates 45 and 46. The AND gates 45 and 46 output the WAY0 active signal and the WAY1 active signal, respectively, that are provided to other input terminals to the OR gates 49 and 50, respectively, when the branch prediction is Not Taken, i.e., when the branch is not taken.

The OR gate 47 outputs "H" to the OR gate 49 when the output of the AND gate 41, 42, or 43 is "H", i.e., when the branch prediction data is Weakly Taken, Strongly Taken/cache miss, or Strongly Taken/cache WAY0.

The OR gate 48 outputs "H" to the OR gate 50 when the branch prediction data is Weakly Taken, Strongly Taken/cache miss, or Strongly Taken/cache WAY1.

The OR gate 49 outputs, to an input terminal 1 of the selector 51, the WAY0 active signal when the branch prediction data is Not Taken and "H" when the branch prediction data indicates Weakly Taken, Strongly Taken/cache miss, or Strongly Taken/cache WAY0.

The OR gate 50 outputs, to an input terminal 1 of the selector 52, the WAY1 active signal when the branch prediction data is Not Taken and "H" when the branch prediction data is Weakly Taken, Strongly Taken/cache miss, or Strongly Taken/cache WAY1.

Another input terminal of each of the selectors 51 and 52, i.e., input terminal 0, is provided with either the WAY0 active signal or the WAY1 active signal, respectively. The selectors 51 and 52 select either of the signals from input terminal 0 or 1 depending on whether the value of the branch instruction detection signal is "0" or "1", and output the selected signals as ReadActive signals to the cache RAMs.

Figure 13:
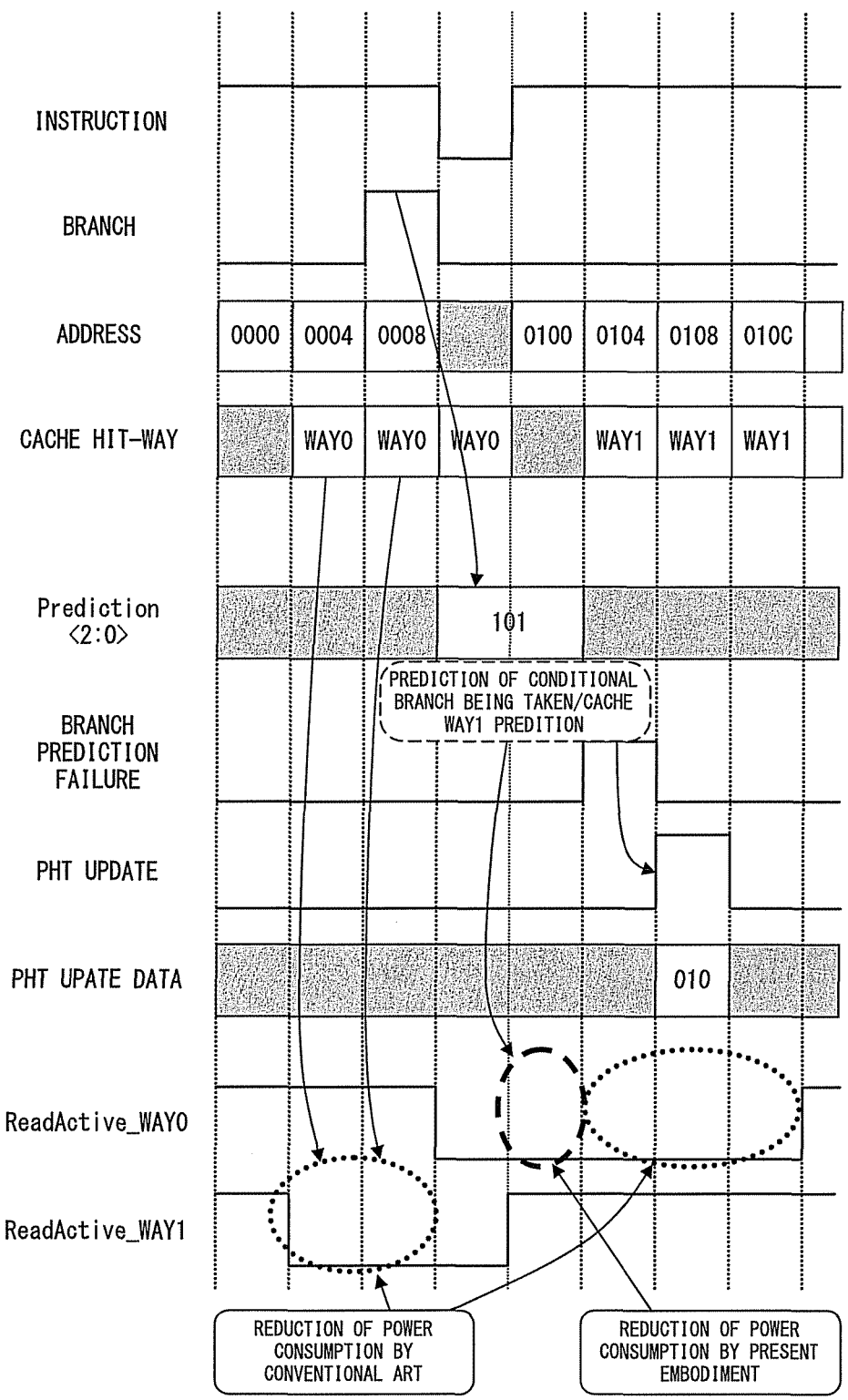
FIG. 13 is a time chart of a first example of the operation of the data processor.
Figure 14:
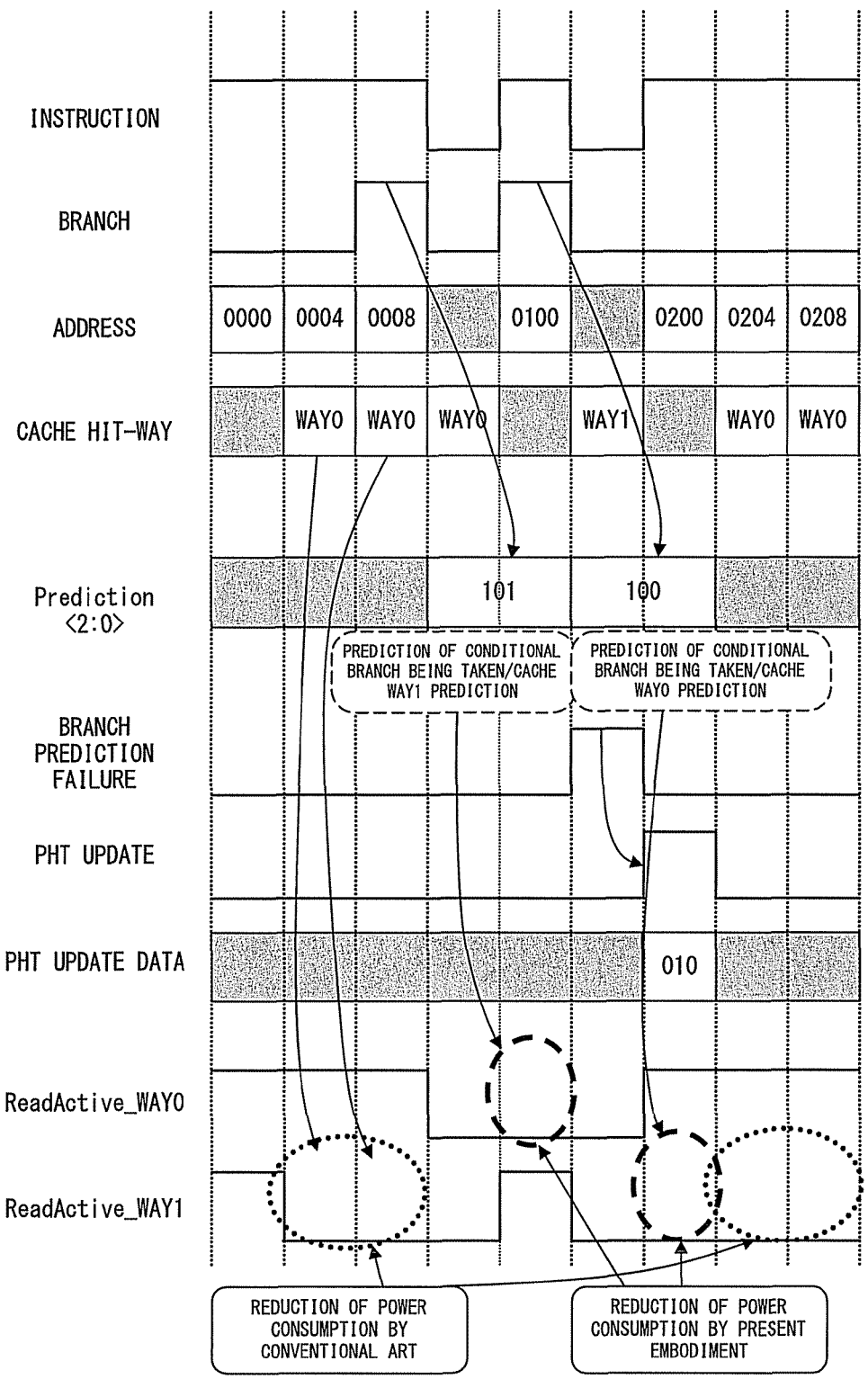
FIG. 14 is a time chart of a second example of the operation of the data processor.
Figure 15:
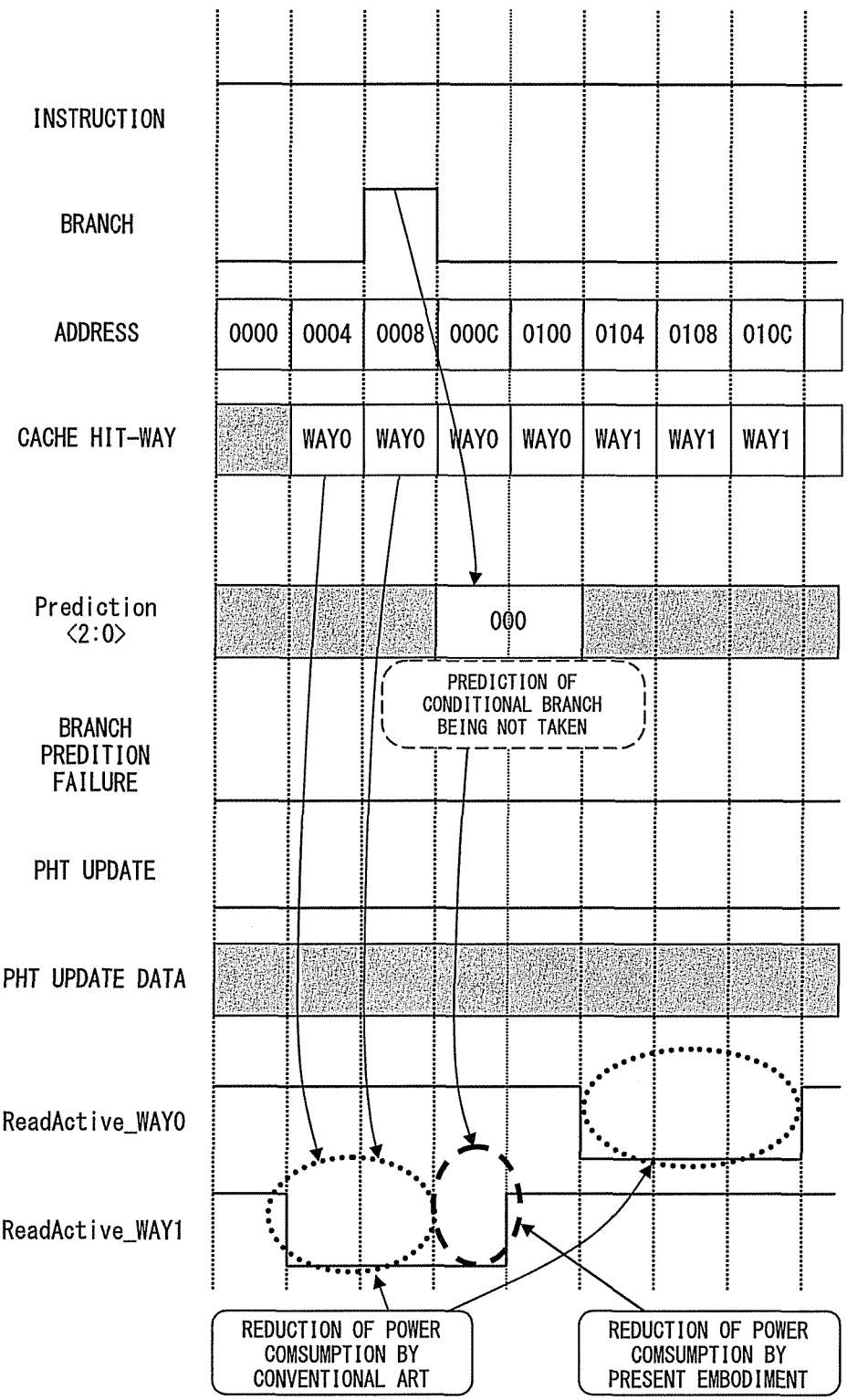
FIG. 15 is a time chart of a third example of the operation of the data processor.

FIG. 13 through FIG. 15 are time charts of an example of operation of the data processor of the present embodiment. These time charts are explained under the assumption that in the present embodiment as explained in FIG. 4, one instruction block consists of four instructions and the cache WAY to the four instructions in one block does not change in the case of sequential access to the instruction sequence.

In FIG. 13, a branch instruction is detected in the third cycle. The present embodiment assumes that when a branch instruction is detected, as a penalty, reading of the instruction data is not performed in the next cycle and the ReadActive signals to the two cache WAYs are "L". The penalty can be applied to the next two cycles or more.

Assume that the prediction data read from the PHT in response to the branch instruction is "101", the conditional branch being taken is predicted, and WAY1 is predicted as cache WAY. When this occurs, the branch prediction data is output in the forth cycle, and as a result, in the fifth cycle, the ReadActive signal to the WAY1 is "H", but the ReadActive signal to the WAY0 remains "L".

In the present embodiment, the execution result of the branch instruction is recognized in the third cycle from the cycle in which the address is provided. When the branch prediction fails, a signal indicating the failure becomes "H", and in response to this signal, the branch prediction data stored in the entry of the PHT is updated. Here, the failure signal indicating that the branch is not taken in the sixth cycle is "H", and "010" indicating Weakly Taken as in the state transition diagram of FIG. 10 is stored in the entry of the PHT.

The bottom of FIG. 13 explains the effect of the power consumption reduction of the present embodiment in addition to the effect of the power consumption reduction employing the conventional art that is the technology described in Patent Document 1. In the conventional art, the WAY of which the read active state is maintained in the next cycle of the block head instruction cycle is still read-active to the instructions in the same block. In other words, in the second cycle and the third cycle, the power consumption is reduced by the ReadActive signal of WAY1 being "L". In the same manner, from the sixth cycle to the eighth cycle, only the WAY that is read-active is maintained in the read-active state, and therefore the effect of the power consumption reduction can be realized.

As described above, in the present embodiment, the ReadActive signals of the two WAYs are "L" as a penalty of the branch instruction in the forth cycle, and in response to the prediction data read in the cycle, the ReadActive signal of the WAY1 is changed to "H" in the fifth cycle, whereas the ReadActive signal of WAY0 is maintained as "L". In the conventional art, as described above, when the branch instruction is detected, both of the active signals of the two WAYs are "H", and therefore the ReadActive signal of WAY0 is "H" in the fifth cycle. In the present embodiment, on the other hand, the ReadActive signal of WAY0 is "L" in the fifth cycle, resulting in an increase in the effect of the power consumption reduction.

FIG. 14 is a time chart of a second example of the operation. In FIG. 14, the operations up to the fourth cycle are the same as those in FIG. 13. In the fifth cycle, the next branch instruction is read, and reading of the instruction is not performed in the sixth cycle in response to the operation in the fifth cycle. In addition, both of the ReadActive signals of the two WAYs are "L".

In response to the next branch instruction, "100" is read as the prediction data from the PHT, and using the branch prediction data, the ReadActive signal of WAY0 is changed to "H" in the seventh cycle; however, the ReadActive signal of WAY1 remains "L". In contrast to the conventional art, the present embodiment achieves the reduction of the power consumption even in the seventh cycle. It should be noted that because the conditional branch that is the execution result of the next branch instruction is "taken" and cache WAY prediction is successful, the branch prediction failure signal is not output, and the PHT is not updated.

In the third example of the operation shown in FIG. 15, because the prediction data corresponding to the branch instruction provided in the third cycle is "000" and the conditional branch being not taken is predicted, unlike the examples in FIG. 14 and FIG. 15, cancelation of instruction data reading and de-asserting of the ReadActive signals of the two WAYs are not performed. When a branch instruction is detected, both of the ReadActive signals of the two WAYS are kept as "H" in the conventional art, whereas the ReadActive signal of WAY1 is changed to "L" in the fourth cycle in the present embodiment. Therefore, the power consumption can be further reduced in the present embodiment by the amount of this difference.

Details of the embodiments of the present invention are provided above; however it is obvious that the embodiments of the present invention are not limited to the above description and the number of the cache WAYs, i.e., the number of cache RAMs of FIG. 7, for example, does not have to be two but can be three or more. In addition, it is also obvious that, for example, the ReadActive control circuit of FIG. 12 can be any circuit that can realize the control logic explained with reference to FIG. 11. Furthermore, it is obvious that the method for determining the index to search the pattern history table is not limited to the method explained with reference to FIG. 9, but, for example, various index determination methods described in Non-Patent Document 1 can be used.

What is claimed is:

1. A data processor, comprising;
a cache unit having a plurality of cache memories;
a branch prediction unit, when an instruction is a branch instruction, configured to perform a conditional branch prediction indicating whether a conditional branch of the branch instruction is taken or not taken and a cache WAY prediction indicating in which cache memory, from among the plurality of cache memories, data of the branch instruction is stored and to output a branch prediction data which is based on the conditional branch prediction and the cache WAY prediction; and
a control unit configured to control an activation of each of the plurality of cache memories,
wherein the branch prediction data has a plurality of states which transits between each other in response to a result of the conditional branch prediction and the cache WAY prediction,
wherein the control unit is configured to control the activation of each of the plurality of cache memories based on a current state of the branch prediction data among the plurality of states.

2. The data processor according to claim 1, wherein the control unit activates at least one of the plurality of cache memories corresponding to the branch prediction data when the branch prediction data indicates that a last one of the conditional branch is taken, and a last one of the cache WAY prediction is hit.

3. The data processor according to claim 2, wherein the control unit activates all of the plurality of cache memories when the branch prediction data indicates that a last one of the conditional branch is taken and a last one of the cache WAY prediction is miss.

4. An activation control method of a plurality of cache memories in cache unit, comprising;
when an instruction is a branch instruction, performing a conditional branch prediction indicating whether a conditional branch of the branch instruction is taken or not taken and a cache WAY prediction indicating in which cache memory, from among the plurality of cache memories, data of the branch instruction is stored;

outputting a branch prediction data which is based on the conditional branch prediction and the cache WAY prediction; and controlling an activation of each of the plurality of cache memories, wherein the branch prediction data has a plurality of states which transits between each other in response to a result of the conditional branch prediction and the cache WAY prediction, wherein the activation of each of the plurality of cache memories is controlled based on a current state of the branch prediction data among the plurality of states.

5. The activation control method of claim 4, wherein the controlling includes activating at least one of the plurality of cache memories corresponding to the branch prediction data when the branch prediction data indicates that a last one of the conditional branch is taken and a last one of the cache WAY prediction is hit.

6. The activation control method of claim 5, wherein the controlling includes activating all of the plurality of cache memories when the branch prediction data indicates that a last one of the conditional branch is taken and a last one of the cache WAY prediction is miss.

* * * * *